United States Patent
Olsson

(10) Patent No.: US 7,023,995 B2
(45) Date of Patent: Apr. 4, 2006

(54) SECURE LOCATION-BASED SERVICES SYSTEM AND METHOD

(75) Inventor: Magnus L. Olsson, Kristianstad (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 811 days.

(21) Appl. No.: 09/988,659

(22) Filed: Nov. 20, 2001

(65) Prior Publication Data

US 2002/0080968 A1 Jun. 27, 2002

Related U.S. Application Data

(60) Provisional application No. 60/254,189, filed on Dec. 8, 2000.

(51) Int. Cl.
*G06F 17/00* (2006.01)

(52) U.S. Cl. .................. 380/258; 380/255; 726/6

(58) Field of Classification Search ............. 709/230; 380/270, 255, 258; 705/1; 455/428; 726/6
See application file for complete search history.

(56) References Cited

U.S. PATENT DOCUMENTS

| | | | |
|---|---|---|---|
| 5,204,902 A | 4/1993 | Reeds, III et al. | |
| 5,239,294 A | 8/1993 | Flanders et al. | |
| 5,377,267 A | 12/1994 | Suzuki et al. | |
| 5,386,468 A | 1/1995 | Akiyama et al. | |
| 5,475,735 A | 12/1995 | Williams et al. | |
| 5,689,563 A | 11/1997 | Brown et al. | |
| 5,729,537 A | 3/1998 | Billström | |
| 5,812,667 A | 9/1998 | Miki et al. | |
| 5,940,512 A | 8/1999 | Tomoike | |
| 5,946,618 A * | 8/1999 | Agre et al. | 455/428 |
| 5,991,621 A | 11/1999 | Alperovich | |
| 6,058,301 A | 5/2000 | Daniels | |
| 6,058,311 A | 5/2000 | Tsukagoshi | |
| 6,072,875 A | 6/2000 | Tsudik | |
| 6,073,017 A * | 6/2000 | Xu et al. | 455/435.1 |
| 6,134,431 A | 10/2000 | Matsumoto et al. | |
| 6,138,003 A | 10/2000 | Kingdon et al. | |
| 6,163,701 A | 12/2000 | Saleh et al. | |
| 6,191,739 B1 * | 2/2001 | Gabber et al. | 342/458 |
| 6,195,557 B1 | 2/2001 | Havinis et al. | |
| 6,199,045 B1 * | 3/2001 | Giniger et al. | 705/1 |

FOREIGN PATENT DOCUMENTS

EP 0 973 351 A1 1/2000

(Continued)

OTHER PUBLICATIONS

Bruce Schneier, 1996, John Wiley & Sons, Inc., "Applied Cryptography", pp. 47-54, 185-187.*

(Continued)

*Primary Examiner*—David Jung
(74) *Attorney, Agent, or Firm*—Potomac Patent Group PLLC

(57) ABSTRACT

A system and method for providing a location-based service from a third party service provider includes encrypting a client's identification information using a public key exchanged with a network location server, wherein the network location server stores a record indicating a location associated with the identification information. The encrypted identification information is transmitted from the client to the third party service provider. The third party service provider transmits a location request to the network location server, the location request including the encrypted identification information received from the client. The third party service provider provides the location-based service according to a response to the location request from the network location server.

33 Claims, 5 Drawing Sheets

FOREIGN PATENT DOCUMENTS

| | | |
|---|---|---|
| EP | 1 041 842 A2 | 10/2000 |
| EP | 1 158 826 A2 | 11/2001 |
| WO | 00/02358 A1 | 1/2000 |
| WO | 00/79724 A2 | 12/2000 |
| WO | 00/79811 A1 | 12/2000 |
| WO | 01/28273 A1 | 4/2001 |

OTHER PUBLICATIONS

Multi-agent system for security service; Shakshuki, E.; Zhonghai Luo; Jing Gong; Qian Chen; Advanced Information Networking and Applications, 2004. AINA 2004. 18th International Conference on vol. 1, 2004 Page(s):303-308 vol. 1.*

A cryptographic protocol to protect MPLS labels; Barlow, D.A.; Vassiliou, V.; Owen, H.L.; Information Assurance Workshop, 2003. IEEE Systems, Man and Cybernetics Society Jun. 18-20, 2003 Page(s):237-242.*

Practical key distribution schemes for channel protection; Yu-Lun Huang; Shieh, S.-P.W.; Jian-Chyuan Wang; Computer Software and Applications Conference, 2000. COMPSAC 2000. The 24th Annual International Oct. 25-27, 2000 Page(s):569-574.*

* cited by examiner

SECURE LOCATION-BASED SERVICES SYSTEM AND METHOD

CROSS-REFERENCE TO RELATED APPLICATIONS

The present application claims priority benefit of provisional U.S. Patent Application Ser. No. 60/254,189 filed Dec. 8, 2000, the disclosure of which is incorporated herein by reference in its entirety.

BACKGROUND

The present invention relates to electronic communication, and more particularly to the use of encryption techniques in location-based services provided by communication networks.

Today's cellular communication systems offer various communication services. Some communication services now rely on position information that accurately characterize the coordinates of mobile stations within a service area. For example, one of the communication services supported is a location service that allows a system subscriber's geographical position to be communicated to third party service providers. The third party service providers may offer various location dependent services requiring the position information. For example, position information is needed for fleet management of trucks and containers, preventing car thefts, locating rented cars and routing emergency calls. Other location dependent services may include providing localized content to subscribers, i.e., advertising, directions to the nearest hospital, restaurant, gas station, etc.

There is a substantial interest in the cellular industry to exploit this new added dimension. At the same time it is also well recognized that location dependent services present concerns relating to the privacy rights of subscribers. Many subscribers are reluctant to have their location monitored to avoid breaches of privacy from various governmental agencies, commercial entities, or even from personal acquaintances. Subscribers would likely participate in location dependent services if given the ability to maintain their anonymity in general and the control over the release of their location information.

Currently there is neither widespread use of location dependent services, nor are world wide standards deployed that utilize subscriber location information to provide location dependent services, e.g., using Web and HTTP technology. Accordingly, standards will likely develop to mandate that subscribers be allowed to make the final determination regarding when and where location information will be used. Subscribers must be able to grant or deny permission to location dependent service providers regarding the use of his/her location information. The privacy issues discussed above are a recognized potential problem, but no solutions have been presented that make the use of location information inherently safe.

For example, one proposed solution is to give a user the option of disabling/enabling all application initiated location capabilities. However, this option disables all application initiated location queries, and if the subscriber chooses to enable the application initiated queries, any agency subscribing to positioning capabilities, which has the subscriber's number, can locate the subscriber at any time.

In addition, granting permission is only part of the problem. Ensuring the integrity and the confidentiality of the location information is not solved by any implicit or explicit means of granting permissions.

Accordingly, there is a need to provide a system and method to provide location dependent services to subscribers while maintaining the subscribers' anonymity, and the integrity and confidentiality of the location information.

SUMMARY

The present invention addresses these and other concerns. Public Key encryption is used to provide location dependent services to subscribers while maintaining the subscribers' anonymity.

According to one aspect, a method for initiating a location-based service from a third party service provider (SP) is provided. A client's identification information is encrypted with an encryption key previously obtained from a network location server (NLS). The encryption key may be a public key in a public key encryption system. The NLS maintains a record indicating a location associated with the identification information. The encrypted identification information is transmitted from the client to the SP. The SP launches a location request to the NLS that includes the encrypted identification information received from the client. The location-based service is provided according to a response to the location request from the NLS.

According to another aspect, a system for providing a location-based service to a subscriber includes a mobile electronic equipment that encrypts the subscriber's identification information using a previously obtained encryption key associated with a NLS and transmits the encrypted identification information. The NLS decrypts the client's encrypted identification information and maintains a record indicating a location associated with the client's identification information. A SP receives the transmitted encrypted identification information from the mobile electronic equipment, transmits a location request to the NLS, the location request including the received encrypted identification information, and provides the location-based service to the subscriber via the mobile electronic equipment according to a response to the location request from the NLS.

According to another aspect, a network entity for providing anonymous location information about mobile clients includes means that determine locations of the mobile clients and associate each mobile client's identification information with a corresponding location. The network entity also includes means that decrypt encrypted client's identification information received with a location request from a service provider to determine a requested corresponding location-based on the mobile client's identification information and means that provide the requested corresponding location of the mobile client to the service provider in response to the location request without identifying the mobile client.

According to another aspect, a mobile client for anonymously receiving location-based services in a communications network includes means that encrypt corresponding mobile client identification information and transmit the encrypted client identification information with a request for the location-based services to a service provider and means that receive and process the location-based services in response to the request.

BRIEF DESCRIPTION OF THE DRAWINGS

The above and other objects, features, and advantages of the present invention will become more apparent in light of the following detailed description in conjunction with the drawings, in which like reference numerals identify similar or identical elements, and in which.

DETAILED DESCRIPTION

Preferred embodiments of the present invention are described below with reference to the accompanying drawings. In the following description, well-known functions and/or constructions are not described in detail to avoid obscuring the invention in unnecessary detail.

Figure 1:
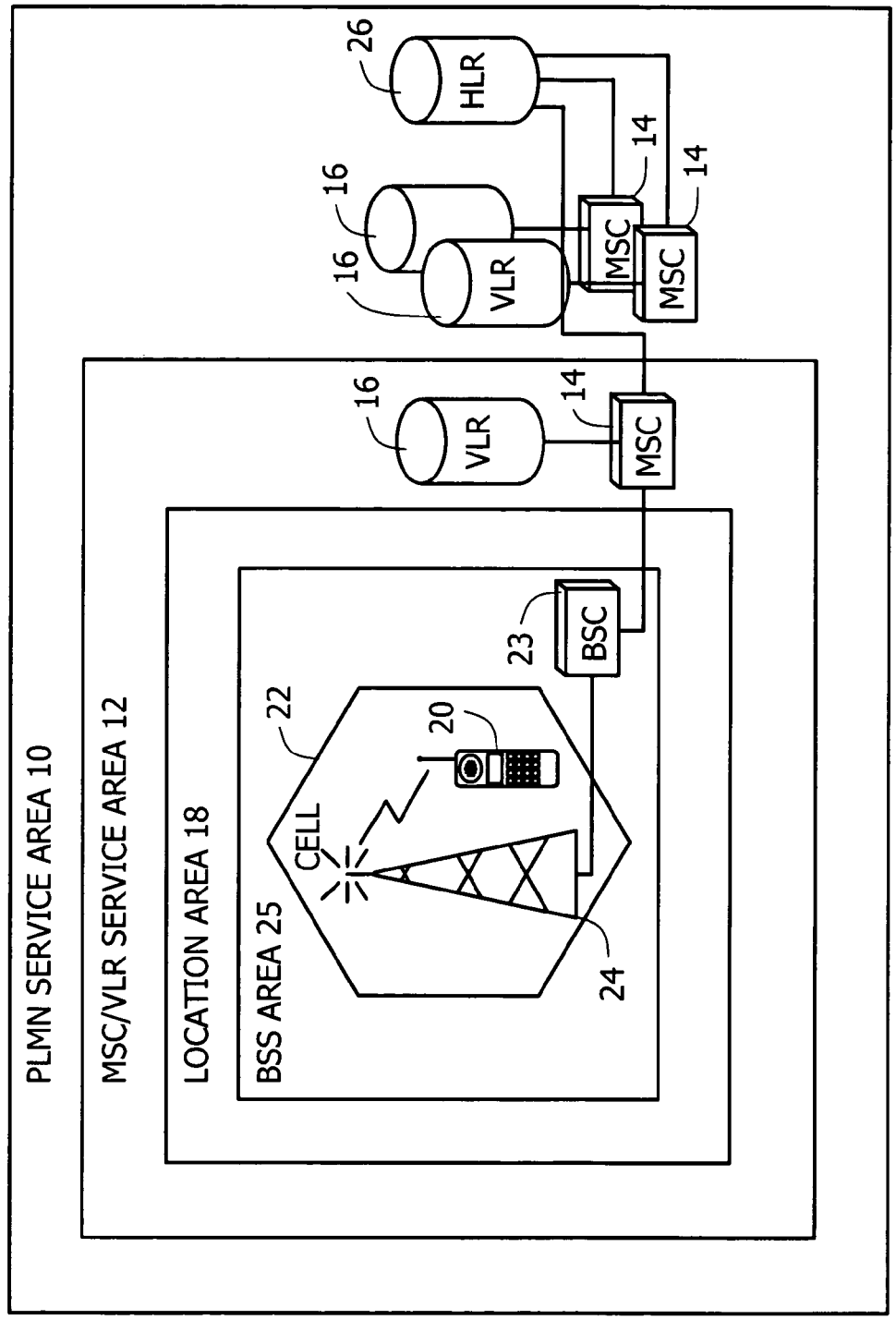
FIG. 1 is a block diagram of a conventional terrestrially-based wireless telecommunications system.

With reference now to FIG. 1 of the drawings, a GSM Public Land Mobile Network (PLMN), such as cellular network 10, is illustrated which is composed of a plurality of areas 12, each with a Mobile Switching Center (MSC) 14 and an integrated Visitor Location Register (VLR) 16 therein. The MSCNLR areas 12, in turn, include a plurality of Location Areas (LA) 18, which are defined as that part of a given MSCNLR area 12 in which a mobile station (MS) (terminal) 20 may move freely without having to send update location information to the MSCNLR area 12 that controls the LA 18. Each Location Area 18 is divided into a number of cells 22. Mobile Station (MS) 20 is the physical equipment, e.g., a car phone or other portable phone, used by mobile subscribers to communicate with the cellular network 10, each other, and users outside the subscribed network, both wireline and wireless.

The MSC 14 is in communication with at least one Base Station Controller (BSC) 23, which, in turn, is in contact with at least one Base Transceiver Station (BTS) 24. The BTS is the physical equipment, illustrated for simplicity as a radio tower, that provides radio coverage to the cell 22 for which it is responsible. It should be understood that the BSC 23 may be connected to several BTS's 24, and may be implemented as a stand-alone node or integrated with the MSC 14. In either event, the BSC 23 and BTS 24 components, as a whole, are generally referred to as a Base Station System (BSS) 25.

The PLMN Service Area or cellular network 10 includes a Home Location Register (HLR) 26, which is a database maintaining all subscriber information, e.g., user profiles, current location information, International Mobile Subscriber Identity (IMSI) numbers, and other administrative information, for subscribers registered within that PLMN 10. The HLR 26 may be co-located with a given MSC 14, integrated with the MSC 14, or alternatively can service multiple MSCs 14, the latter of which is illustrated in FIG. 1.

The VLR 16 is a database containing information about all of the MS's 20 currently located within the MSCNLR area 12. If an MS 20 roams into a new MSCNLR area 12, the VLR 16 connected to that MSC 14 requests data about that MS 20 from the HLR database 26 (simultaneously informing the HLR 26 about the current location of the MS 20). Accordingly, if the user of the MS 20 then wants to make a call, the local VLR 16 will have the requisite identification information without having to reinterrogate the HLR 26. In the above described manner, the VLR and HLR databases 16 and 26, respectively, contain various subscriber information associated with a given MS 20.

Figure 2:
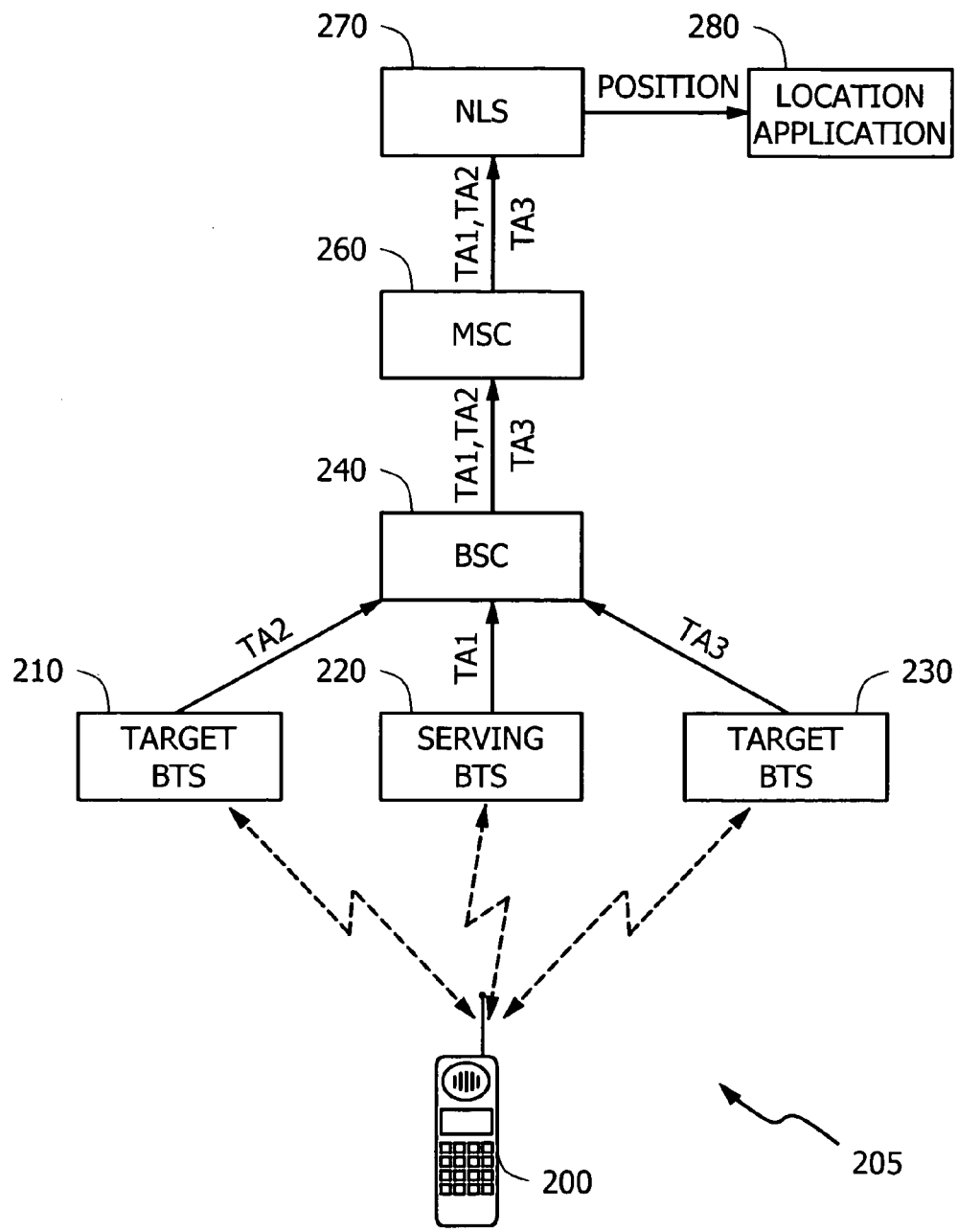
FIG. 2 illustrates a conventional positioning method in which positioning information is acquired.

As illustrated in FIG. 2 of the drawings, upon a network positioning request, the Base Station System (BSS) (220 and 240) serving the MS 200 to be positioned generates positioning data, which is delivered to the MSC 260. This positioning data is then forwarded to a Network Location Server (NLS) 270 for calculation of the geographical location of the MS 200.

The NLS 270 is also commonly referred to as a Mobile Positioning Center, Mobile Positioning Server, or even a Gateway Mobile Location Center. The NLS 270 may also be thought of as a logical entity, i.e., not the actual function that provides the location but instead functions as a proxy for the location functionality in the network. For example, the NLS 270 may contain an association of the used identity and the true identity of the MS 200 and then request the location from the network functionality using that true identity.

The location of the MS 200 can then be provided to a Location Application (LA) 280 that requested the positioning. Alternatively, the requesting LA 280 could be located within the MS 200 itself, within the MSCNLR 260 or could be an external node, such as an Intelligent Network (IN) node or a third party location-based service provider.

In order to accurately determine the location of the MS 200, positioning data from three or more separate BTS's (210,220, and 230) is required. This positioning data for GSM systems can include, for example, a Timing Advance (TA) value, which corresponds to the amount of time in advance that the MS 200 must send a message in order for the BTS 220 to receive it in the time slot allocated to that MS 200. When a message is sent from the MS 200 to the BTS 220, there is a propagation delay, which depends upon the distance between the MS 200 and the BTS 220. TA values are expressed in bit periods, and can range from 0 to 63, with each bit period corresponding to approximately 550 meters between the MS 200 and the BTS 220.

Once a TA value is determined for one BTS 220, the distance between the MS 200 and that particular BTS 220 is known, but the actual location is not. If, for example, the TA value equals one, the MS 200 could be anywhere along a radius of 550 meters. Two TA values from two BTSs, for example, BTSs 210 and 220, provide two possible points that the MS 200 could be located (where the two radiuses intersect). However, with three TA values from three BTSs, e.g., BTSs 210, 220, and 230, the location of the MS 200 can be determined with a certain degree of accuracy. Using a triangulation algorithm, with knowledge of the three TA values and site location data associated with each BTS (210, 220, and 230), the position of the MS 200 can be determined (with certain accuracy) by the NLS 270.

It should be understood, however, that any estimate of time, distance, or angle for any cellular system 205 can be used, instead of the TA value discussed herein. For example, the MS 200 can have a Global Positioning System (GPS) receiver built into it, which is used to determine the location of the MS 200. In addition, the MS 200 can collect positioning data based on the Observed Time Difference (OTD) between the time a BTS 220 sends out a signal and the time the MS 200 receives the signal. This time difference information can be sent to the NLS 270 for calculation of the location of the MS 200. Alternatively, the MS 200, with knowledge of the location of the BTS 220, can determine its location.

Existing technology can provide subscribers with the ability to prevent LAs 280 from positioning them in order to protect their privacy. However, preventing positioning altogether eliminates the subscriber's ability to use all location-based services. A subscriber may want to selectively use a subset of the location-based services available to him, while maintaining anonymity with respect to all location-based service providers.

The method and system of the present invention uses encryption to prevent a third party location-based service provider from obtaining the identity of a subscriber. Encryption allows information exchanged between two or more parties to be secured so that the information may only be decrypted by the receiving party. The communicated information is encrypted according to some system that the users have agreed in advance to use. There are several encryption methods, such as the data encryption standard (DES) and public key cryptography (PKC). A classical cryptographic system is generally a set of instructions, a piece of hardware, or a computer program that can convert unencrypted information, for example plaintext, to encrypted information, for example ciphertext, or vice versa, in a variety of ways, one of which is selected by a specific key that is known to the users but is kept secret from others. The DES is a classical cryptographic system.

PKC systems make use of the fact that finding large prime numbers is computationally easy, but factoring the products of two large prime numbers is computationally difficult. PKC systems have an advantage over other cryptographic systems like the DES in that a PKC system uses a key for decryption that is different from the key for encryption. Each entity has a private key and a public key. Public keys are generally held in databases run by "Key Certificate Authorities" and are publicly known. However, each user's private key is known only to that user. Once a sender encrypts a message with a recipient's public key, it can only be decrypted using that recipient's private key. Thus, encryption is performed using only the public key, which is published for use by others, and the difficulty of securely distributing keys is avoided.

In addition to decrypting received messages, the private key may also be used to by a sender to sign a message with a digital signature prior to sending it. The message recipients can then use their copy of the sender's public key to check the digital signature to verify the identity of the sender and that it has not been altered while in transit.

In order to resolve a location using a network based location method, as described above, the identity of the mobile client must be known. However, in general, location-based services do not need the mobile client identity (client ID), or the subscriber's identity, to provide services. A third party location-based service provider (SP) can be required to retrieve the location information by sending a request to the NLS 270, thereby maintaining the anonymity of the mobile client.

Figure 3:
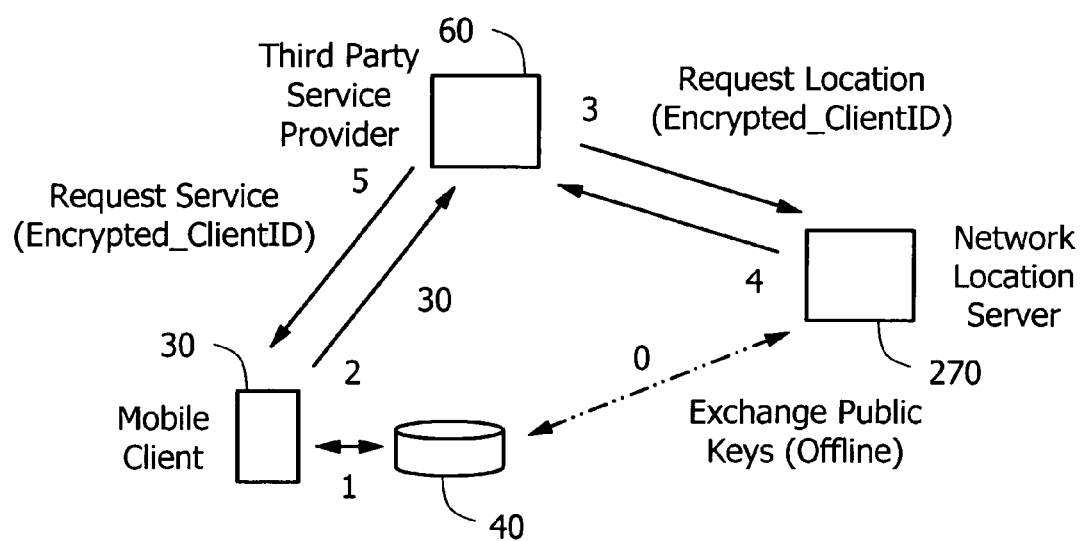
FIG. 3 is a diagram illustrating a client initiated system and method providing location dependent services using public key encryption according to an embodiment of the present invention.

FIG. 3 is a diagram illustrating a client initiated system and method providing location dependent services using public key encryption according to an embodiment of the present invention. A transaction in a client-initiated service, also referred to as a "pull" service, is requested by the mobile client (MC) 30, i.e., a mobile station subscriber.

Referring to FIG. 3, the Mobile Client's ID, e.g., a Mobile Station Integrated Services Digital Network (MSISDN) ID, is stored in a memory 40 associated with the MC 30. The MC 30 and the NLS 270 associated with the network exchange public keys (step 0). This step may be performed offline. The MC 30 signs the client ID using its private key and encrypts the client ID using the public key provided by the NLS 270 (step 1). The MC 30 sends a service request message to a SP 60 via, e.g., a wireless application protocol universal resource locator (WAP URL), including the secured client ID (step 2). The SP 60 sends a location request message to request corresponding location information from NLS 270 using the secured client ID (step 3), from which the SP 60 cannot determine the subscriber's identity. The NLS 270 provides the corresponding location information to the SP 60 (step 4). The SP 60, using the location information, provides the location dependent service to the MC 30 (step 5) while maintaining the anonymity of the MC 30.

Additional security and privacy may also be provided by adding layers of encryption. For example, in an alternative embodiment shown in FIG. 5, in addition to exchanging public key(s) with the NLS 270, the MC 30 also exchanges public key(s) with the SP 60 and the SP 60 with the NLS 270 (step 50). Here again, the exchange of public keys may be performed while offline or as part of the ongoing transaction, but prior to the actual process of encrypting the MC 30 data.

The MC 30 then encrypts its identity (client ID) twice to create the secured client ID (step 51). Here, an implementation dependent sequence number that identifies each transaction may optionally be encrypted along with the client ID. This transaction ID number will, when encrypted, yield a one-time password that is preferably unique. The transaction ID number, and/or resulting one-time password, allows identification and tracking of each transaction for later termination and/or changes to the provided service. For example, the SP 60 may associate a duration of service with the transaction ID. The transaction ID may also be used for other purposes. Some of the other possible uses for the transaction ID are to identify the transaction for billing purposes and/or to verify that only a subscriber is accessing the service (and not unauthorized individuals attempting theft of service). In either case, the MC 30 encrypts the client ID (and optional transaction ID number) a first time using a public key of the NLS 270, and then encrypts the encrypted client ID (encrypts a second time) using a public key of the SP 60. The twice encrypted client ID is then forwarded to the SP 60 (step 52).

The SP 60 decrypts the twice encrypted client ID using the SP private key to obtain the encrypted client ID, and forwards the encrypted client ID in (or with) a location request message to the NLS 270 (step 53). Additionally, the SP 60 may sign the location request message with a digital signature using its private key prior to sending it to the NLS 270. The NLS 270 receives and decrypts the location request message using the NLS private key. If the SP's 60 signature is included, the NLS 270 verifies the signature of the SP 60 using the SP public key (which is previously known).

The NLS 270 uses the client ID in the location request message in a relevant location procedure to obtain the location information for MC 30 and prepare a corresponding location information message. Additionally, the NLS 270 may sign the location information message using the NLS private key. In either case, the NLS 270 then encrypts the entire location information message a using the SP public key prior and sends the message to the SP 60 (step 54).

The SP 60 decrypts the location information message received from the NLS 270. If the NLS's 270 signature is included, the SP 60 verifies the signature using the NLS public key. The SP 60 then generates a service response message to the initial service request from the MC 30 with the requested service adapted to the location of the MC 30. Additionally, the SP 60 may sign the response using the SP private key. In either case, the response is encrypted using the MC public key. The MC 30 then decrypts the service response message received from the SP 60. If the SP's 60 signature is included, the MC 40 verifies the signature of the SP 60 using the SP public key. The requested service may then be presented to the subscriber via the MC 30 device, i.e., to the end-user of the device.

Figure 4:
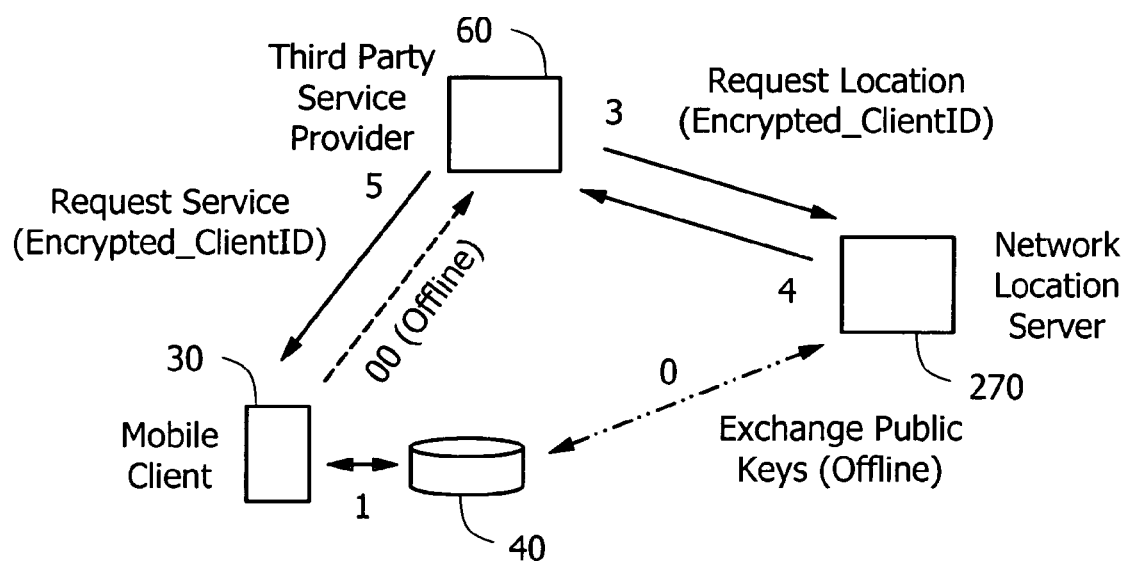
FIG. 4 is a diagram illustrating a service initiated system and method providing location dependent services using public key encryption according to another embodiment of the present invention.
Figure 5:
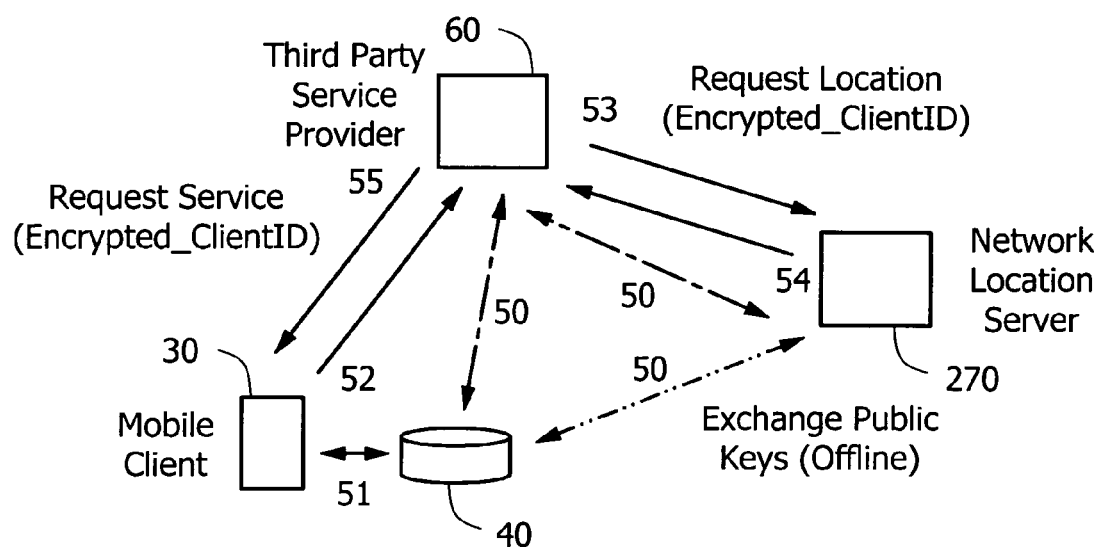
FIG. 5 is a diagram illustrating a system and method providing location dependent services using public key encryption according to another embodiment of the present invention.

In the embodiment of FIGS. 3 and 5, the MC 30 selects a desired location dependent service(s) by initiating a request to the SP 60. In another embodiment, the MC 30 may give prior permission to a particular one, or to a group of, location dependent service(s). The SP 60 initiates the service. FIG. 4 is a diagram illustrating such a service initiated system and method, also called a push-type service.

Referring to FIG. 4, in a service initiated system the MC 30 provides the encrypted client ID to the SP 60 while offline instead of providing it to the SP 60 with each service request (step 00). The encrypted client ID is therefore known in advance by the SP 60, e.g., as part of a subscription to the service. When the SP 60 initiates the service, according to a schedule or other predefined event, the encrypted client ID is used to retrieve the location from the NLS 270 (steps 3 and 4). The SP 60 forwards the service to the MC 30 (step 5), using, e.g., WAP.

While the invention is described with reference to Public Key Encryption, the invention is not limited in this respect. It will be understood that the process of cryptographic signing and encryption is well known by persons of ordinary skill in the art. Additional or different encryption techniques may be used without departing from the scope or spirit of the invention. The exemplary method described above illustrates only one possible solution. For example, depending on the key and/or content lengths used, a hash may be signed with the private key, instead of the entire content. Further, a shared secret can be used for the overall encryption, instead of the public key of the receiving entity.

It is also possible to use the invention without the process of cryptographic signing or encryption between some or all of the individual communicating entities, e.g., MC to SP and SP to NLS. It should also be noted that the client ID may alternatively be added by an intermediate node, e.g., an access point or a WAP gateway.

The present invention provides several benefits. Existing security features may be used as implemented by most WAP terminals, such as WAP Wireless Identity Module (WIN), which stores Public Key Certificates, etc. Established cryptographic principles are used, such as PKC. Extensive use of location information is provided, while maintaining the anonymity of the subscribers, which promotes the use of location dependent services. Finally, it provides a method for safely combining multiple information sources in a secure way.

It will be appreciated that the steps of the methods illustrated above may be readily implemented either by software that is executed by a suitable processor or by hardware, such as an application-specific integrated circuit (ASIC).

Although described with reference to a communication system, it will be appreciated by those of ordinary skill in the art that this invention can be embodied in other specific forms without departing from its essential character. For example, the invention may be used in any multi-processor system. The embodiments described above should therefore be considered in all respects to be illustrative and not restrictive.

The various aspects of the invention have been described in connection with a number of exemplary embodiments. To facilitate an understanding of the invention, many aspects of the invention were described in terms of sequences of actions that may be performed by elements of a computer system. For example, it will be recognized that in each of the embodiments, the various actions could be performed by specialized circuits (e.g., discrete logic gates interconnected to perform a specialized function), by program instructions being executed by one or more processors, or by a combination of both.

Moreover, the invention can additionally be considered to be embodied entirely within any form of computer readable storage medium having stored therein an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiment may be referred to herein as "logic configured to" perform a described action, or alternatively as "logic that" performs a described action.

It should be emphasized that the terms "comprises" and "comprising", when used in this specification as well as the claims, are taken to specify the presence of stated features, steps or components; but the use of these terms does not preclude the presence or addition of one or more other features, steps, components or groups thereof.

Various embodiments of Applicants' invention have been described, but it will be appreciated by those of ordinary skill in this art that these embodiments are merely illustrative and that many other embodiments are possible. The intended scope of the invention is set forth by the following claims, rather than the preceding description, and all variations that fall within the scope of the claims are intended to be embraced therein.

What is claimed is:

1. A method for initiating a location-based service from a third party service provider (SP), comprising the steps of:
   encrypting a client's identification information using an encryption key previously obtained from a network location server (NLS), wherein the NLS maintains a record indicating a location associated with the identification information;
   transmitting the encrypted identification information from the client to the SP;
   launching a location request from the SP to the NLS, the location request including the encrypted identification information received from the client; and
   providing the location-based service according to a response to the location request from the NLS.

2. The method of claim 1, wherein in the providing step, the location-based service is provided directly to the client by the SP.

3. The method of claim 1, wherein the client is a mobile station in a cellular network.

4. The method of claim 1, wherein a transaction identification number for tracking and identifying the transaction is transmitted with the encrypted identification information.

5. The method of claim 4, wherein the transaction identification number is encrypted to yield a one-time password prior to being transmitted with the encrypted identification information.

6. The method of claim 1, wherein the encryption key is a public key and the client's identification is encrypted using a public key cryptography (PKC) method.

7. The method of claim 6, wherein prior to transmitting the encrypted identification information, the client signs the information with a digital signature and before providing a response to the location request the NLS uses a previously obtained public key associated with the client to verify the information according to the digital signature.

8. The method of claim 1, wherein the encryption key is obtained from the NLS while offline.

9. The method of claim 1, wherein the step of transmitting the encrypted identification information from the client to the SP is performed offline.

10. The method of claim 1, wherein the SP provides the location-based service according to a response to the location request from the NLS and according to a previously established schedule corresponding to the client.

11. The method of claim 1, wherein prior to launching a location request, the SP encrypts the location request and the encrypted identification information and before providing a response to the location request the NLS uses a previously obtained encryption key associated with the SP to decrypt the location request and information.

12. A system for providing a location-based service to a subscriber, the system comprising:

mobile electronic equipment that encrypts the subscriber's identification information using a previously obtained encryption key associated with a NLS and that transmits the encrypted identification information;

the NLS that decrypts the client's encrypted identification information and maintains a record indicating a location associated with the client's identification information; and a SP that receives the transmitted encrypted identification information from the mobile electronic equipment, transmits a location request to the NLS, the location request including the received encrypted identification information, and provides the location-based service to the subscriber via the mobile electronic equipment according to a response to the location request from the NLS.

13. The system of claim 12, wherein the location-based service is provided directly to the client by the SP.

14. The system of claim 12, wherein the mobile electronic equipment is a mobile station in a cellular network.

15. The system of claim 12, wherein a transaction identification number for tracking and identifying the transaction is transmitted with the encrypted identification information.

16. The system of claim 15, wherein the transaction identification number is encrypted to yield a one-time password prior to being transmitted with the encrypted identification information.

17. The system of claim 12, wherein the encryption key is a public key and the subscriber's identification is encrypted using a public key cryptography (PKC) method.

18. The system of claim 12, wherein public key is obtained from the NLS while offline.

19. The system of claim 12, wherein the encrypted identification information is transmitted from the client to the SP while offline.

20. The system of claim 12, wherein the SP provides the location-based service according to a response to the location request from the NLS and according to a previously established schedule corresponding to the client.

21. A network entity for providing anonymous location information about mobile clients, the network entity comprising:

means that determine locations of the mobile clients and associate each mobile client's identification information with a corresponding location;

means that decrypt encrypted client's identification information received with a location request from a service provider to determine a requested corresponding location-based on the mobile client's identification information;

means that provide the requested corresponding location of the mobile client to the service provider in response to the location request without identifying the mobile client.

22. The network entity of claim 21, wherein the mobile client is a mobile station in a cellular network.

23. The network entity of claim 22, wherein the client's identification information is encrypted and decrypted using a public key cryptography (PKC) method.

24. A computer program product for providing a location-based service from a SP to a client, the computer program product comprising:

a computer-readable storage medium having computer-readable program code means embodied in said medium, said computer-readable program code means including:

logic that encrypts a client's identification information using a public key exchanged with a NLS, wherein the NLS stores a record indicating a location associated with the identification information;

logic that transmits the encrypted identification information from the client to the SP;

logic that launches a location request from the SP to the NLS, the location request including the encrypted identification information received from the client; and logic that provides the location-based service according to a response to the location request from the NLS.

25. The computer program product of claim 24, wherein the client is a mobile station subscriber.

26. The computer program product of claim 24, wherein the client's identification is encrypted using a public key cryptography (PKC) method.

27. A mobile client for anonymously receiving location-based services in a communications network, the mobile client comprising:

means that encrypt corresponding mobile client identification information and transmit the encrypted client identification information with a request for the location-based services to a service provider; and means that receive and process the location-based services in response to the request.

28. The mobile client of claim 27, wherein the mobile client is a mobile station in a cellular network.

29. The mobile client of claim 27, wherein the mobile client additionally includes means that exchange encryption keys with a network entity responsible for maintaining location information corresponding to the mobile client.

30. The mobile client of claim 29, wherein the mobile client additionally includes means that, prior to transmission, sign the client identification information and the request for the location-based services with a digital signature to provide verification of the mobile client to the network entity.

31. The mobile client of claim 27, wherein the client identification information is encrypted using a public key cryptography (PKC) method.

32. The mobile client of claim 27, wherein the mobile client additionally includes means that encrypt corresponding transaction identification information and transmits the encrypted transaction identification information with the request for the location-based services to the service provider, the encrypted transaction identification information providing transaction tracking and verification.

33. The mobile client of claim 32, wherein the encrypted transaction identification information acts as a one-time password.

* * * * *